Sept. 24, 1957               O. F. FOIN, JR               2,807,714
COMBINATION T.-R. GAS SWITCHING TUBE AND A
GAS R.F. ANTENNA TUBE
Filed May 14, 1948
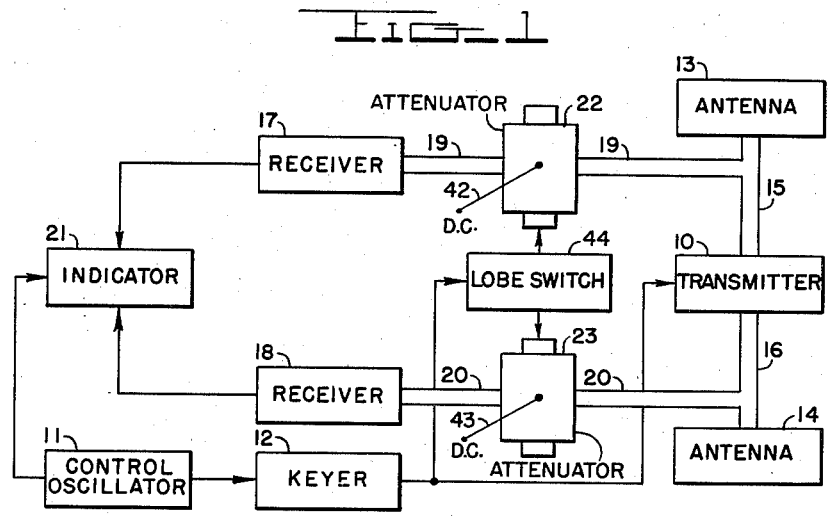
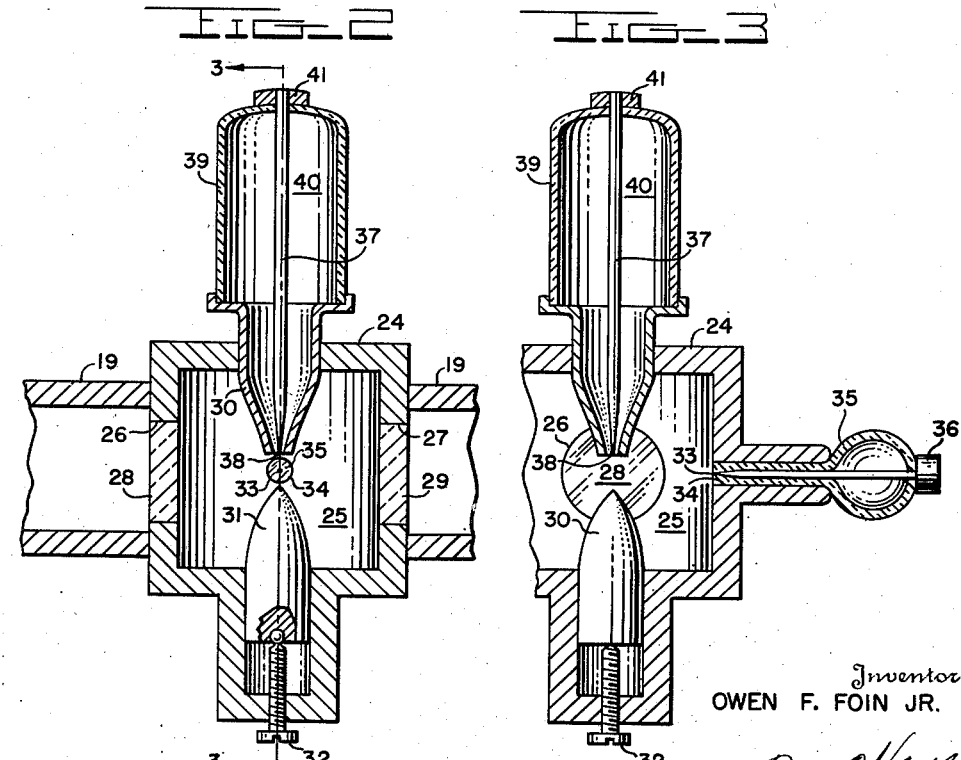
Inventor
OWEN F. FOIN JR.

United States Patent Office 2,807,714
Patented Sept. 24, 1957

2,807,714
COMBINATION T.-R. GAS SWITCHING TUBE AND A GAS R. F. ANTENNA TUBE

Owen F. Foin, Jr., Fresno, Calif.

Application May 14, 1948, Serial No. 27,097

5 Claims. (Cl. 250—13)

(Granted under Title 35, U. S. Code (1952), sec. 266)

This invention relates to attenuator devices and more particularly to a device for automatically and/or selectively attenuating electromagnetic energy in accordance with the intensity thereof.

There are numerous uses in the art for a device capable of intensity sensitive attenuation of electromagnetic energy waves. One of such uses occurs in radio pulse lobe switching systems such as a system including a radio pulse transmitter feeding a pair of antenna positioned to produce divergent overlapping pulse energy radiation patterns or lobes, and mechanical lobe switching means for alternately applying energy passed by each antenna through separate receiver channels to an indicating device whereon an accurate indication of the position of a remote object with respect to the divergent patterns is produced. When the system is utilized for tracking a moving remote object the accuracy of the indication produced thereby is proportional to the operating speed of the mechanical lobe switching means. In order to obtain optimum lobe switching speed electronic switching tubes have been employed for lobe switching the receiver channels at a rate equal to one half the transmitted pulse repetition rate. Since the receivers are coupled to a common transmitter a suitable protection device is necessarily employed in the receiver channels for effectively disconnecting the receivers during intervals when high intensity pulses are produced. The electronic lobe switching tubes and the receiver protection devices present inherent insertion losses to the receiver channels that substantially reduces the overall efficiency of the system. Moreover, the use of separate devices for receiver protection and for lobe switching increases the size and expense of the system.

It is therefore an object of the present invention to provide novel means for intensity sensitive attenuation of electromagnetic energy waves.

Another object is to provide a novel device for attenuating high intensity electromagnetic energy and for selectively attenuating low intensity electromagnetic energy.

Another object is to provide a novel device for attenuating high intensity electromagnetic energy waves and for selectively attenuating low intensity electromagnetic energy waves in accordance with a predetermined controlling influence.

Another object is to provide a novel electronic device adapted for inclusion in the input channel of a receiver for protecting the receiver from high intensity electromagnetic energy waves and for selectively attenuating low intensity electromagnetic energy waves.

Another object is to provide a novel device capable of performing the combined functions of receiver protection and lobe switching.

Still another object of the present invention is to provide a radio pulse system of the type incorporating lobe switching and employing a transmitter for transmitting high intensity radio frequency pulses and a plurality of receiving antennae each feeding the system through a novel device designed to perform the combined functions of protecting the receiver during operation of the transmitter and for effectively disconnecting the antennae from the system in synchronism with a predetermined controlling influence.

Still another object is to provide a radio pulse system having the foregoing characteristics wherein the novel device is operable to effectively disconnect the receiving antennae during intervals when high intensity pulses are produced by the transmitter and for alternatively or successively effectively disconnecting the antennae during intervals between the high intensity pulses.

A still further object of the present invention is to provide a novel attenuator device including a resonant cavity so characterized as to attenuate high intensity energy waves and to selectively attenuate low intensity waves of all frequencies determined by the Q of the resonant cavity at all mean resonant frequencies thereof.

Other objects and features of the present invention will appear more fully hereinafter from the following detailed description considered in connection with the accompanying drawing which discloses one embodiment of the invention. It is to be expressly understood however that the drawing is designed for purposes of illustration only and not as a definition of the limits of the invention, reference for the latter purpose being had to the appended claims.

In the drawing, wherein similar reference characters denote similar elements throughout the several views:

Fig. 1 is a diagrammatic illustration of a radio pulse system including attenuator devices constructed in accordance with the principles of the present invention;

Fig. 2 is a sectional illustration of a novel attenuator device included in the system disclosed in Fig. 1, and, Fig. 3 is a sectional illustration through the line 3—3 of Fig. 2.

With reference more particularly to Fig. 1 of the drawing, a radio pulse system employing lobe switching, through use of a pair of attenuator devices constructed in accordance with the principles of the present invention, is disclosed therein including a radio frequency transmitter 10 for producing a series of spaced high intensity radio frequency pulses at a rate determined by a control oscillator 11 through operation of a keyer 12. The high intensity pulses from the transmitter 10 are fed to antenna 13 and to antenna 14 through mechanical transmission mediums, such as hollow wave guides 15 and 16, respectively. The antennae 13 and 14 are adjacently mounted so that the energy patterns, or lobes thereof are divergent and partially overlapping. Radio frequency receivers 17 and 18, tuned to the desired operating frequency, are respectively coupled to the antenna 13 and to the antenna 14 through connections with the wave guides 15 and 16 by way of receiver transmission mediums 19 and 20, respectively, shown in the form of hollow wave guides. The receivers 17 and 18 include conventional demodulating and amplifying circuits and provide outputs which are fed to a suitable indicator 21 which may take the form of a cathode ray oscilloscope and associated sweep circuits synchronized by the main control oscillator 11.

In order to protect the receivers 17 and 18 during intervals when high intensity radio frequency pulses are produced by the transmitter 10 while allowing substantially unattenuated reception of low intensity signals such as echo pulses produced when the high intensity pulses impinge upon and reflect from remote objects, and to provide lobe switching in the receiver channels of the system, attenuator devices 22 and 23, constructed in accordance with the principles of the present invention, are respectively positioned in the receiver transmission mediums 19 and 20. The attenuator devices 22 and 23 are similar, and the construction and operation thereof will be more fully understood with reference to Figs. 2 and 3 of the drawing. As shown, the devices include a hollow cylindrical metallic member 24 forming a cylindrical cavity 25. The cavity 25 is coupled to the receiver transmission mediums, such as the wave guide 19, through circular irises 26 and 27. The circular irises 26 and 27 are provided with suitable dielectric windows 28 and 29, respectively, to allow the cavity 25 to be filled with a suitable gas or gases under predetermined pressures. A gas switch, in the form of a voltage discharge device or spark gap, is positioned in the cavity 25. The switch includes hollow cone-shaped metallic member 30 having an open apex and a closed cone-shaped metallic member 31, extending in opposite direction in symmetrical relation with respect to the longitudinal axis of the cylindrical member 24 with the apices thereof in opposed relation. The spacing between the apices of the cone-shaped members 30 and 31 is adjustable to tune the cavity 25 into resonance at the operating frequency. This adjustment is accomplished by varying the relative position of the cone-shaped member 31 with respect to the cylindrical member 24 upon operation of adjusting screw 32. The cone-shaped members 30 and 31 are positioned in the cavity 25 to effect a concentration of potential incident to the electromagnetic field within the cavity 25 and to cause a gas discharge to occur between the adjacent apices thereof in the presence of energy waves of an intensity greater than a predetermined intensity. The occurrence of a gas discharge destroys the resonant condition of the cavity 25 and prevents transmission of energy through the wave guide 19.

Means are also provided for accelerating formation of the gas discharge, in the presence of high intensity waves, to prevent substantial transmission of high intensity energy through the wave guide 19 prior to formation of the gas discharge. As shown more clearly in Fig. 3, the foregoing means includes a keep-alive electrode 33 mounted perpendicular to the axis of the cone-shaped members 30 and 31 in a recess 34 provided in the cylindrical member 24. The electrode 33 is insulated from the wall of the member 24 by means of glass supporting member 35 except for the tip thereof adjacent the cavity 25 and is provided with an external terminal 36. When a suitable negative potential is applied to the terminal 36 a constant source of ions is produced adjacent the uninsulated tip of the electrode 33. The applied potential is adjusted so that a sufficient number of ions are continuously produced to effect substantially instantaneous formation of a gas discharge between the cone-shaped members 30 and 31 following the presence of high intensity waves, while the number of ions produced and the configuration of the electrode 33 are selected so that a gas discharge is not formed in the presence of low intensity waves.

The attenuator device further includes a switching electrode 37 positioned inside the hollow cone-shaped member 30, with the end 38 thereof terminated in predetermined spaced relationship with the open apex of the member 30. The switching electrode 37 is supported in the foregoing manner by means of insulating cup-shaped member 39 which also forms the walls and end of a reservoir 40 for the gas included within the cavity 25. A potential supply terminal 41 is secured to the upper end of the switching electrode 37, as viewed in the drawing, outside the insulating member 39. When an operating potential is applied to the switching electrode 37, a concentration of ions is produced within the region adjacent the open apex of the cone-shaped member 30. With proper selection of the spacing between the end 38 of the electrode 37 and the open apex of cone-shaped member 30, the operating potential, and the gas or combination of gases and pressures thereof included within the cavity 25, a sufficient concentration of ions is produced for substantial interaction with low intensity waves to effect attenuation thereof. It is to be expressly understood that the degree of attenuation may be varied, as desired, by controlling the operating potential applied.

When the novel attenuator device disclosed in Figs. 2 and 3 is incorporated in a radio pulse system, such as the type described heretofore relative to Fig. 1 of the drawing, a suitable negative potential is continuously applied to the keep-alive electrode 33, through conductors 42 and 43, to thus assure adequate protection of the receivers 17 and 18 during the intervals when the transmitter 10 produces high intensity pulses. The lobe switching is accomplished by alternatively applying a high potential bias to the switching electrode of the devices 22 and 23 in synchronism with operation of the transmitter 10. For this purpose a lobe switch 44 is provided having connections to the switching electrodes of the devices 22 and 23 and a connection with the keyer 12. The lobe switch 44 may take the form of a conventional multivibrator including a two stage resistance-capacity coupled amplifier with the output of each stage thereof coupled to a switching electrode of one of the attenuator devices, and with the multivibrator operating in synchronism with the output pulses from the keyer 12. Other forms of synchronizable "flip-flop" circuits well known to the art are adequate to serve the purpose of the lobe switch 44. With this arrangement, an operating potential is alternately applied to the switching electrode of the devices 22 and 23 in synchronism with transmitted pulses.

In operation of the system disclosed in Fig. 1, the devices 22 and 23 function as conventional receiver protection devices to prevent application of high intensity pulses produced by the transmitter 10 to the receivers 17 and 18. The lobe switch 44 operates in synchronism with generation of high intensity pulses to apply an operating bias to the switching electrode 37 of one of the devices 22 and 23, and to maintain such bias until the next successive pulse is produced by the transmitter 10, at which time the lobe switch 44 functions to apply the operating bias to the switching electrode of the other device for a period of time equal to the period between high intensity pulses. Therefore, low intensity signals such as echo pulses received by the antennae 13 and 14, are alternately fed to the receivers 17 and 18 at a rate directly proportional to the pulse transmission rate. Since the devices 22 and 23 and other elements of the system such as the keyer 12, transmitter 10 and lobe switch 44 are capable of high speed intermittent operation, and since the receiver outputs are alternately applied to the indicator 21 at an optimum rate, a persistent indication of the instantaneous position of an object with respect to the patterns of the antennae is provided.

It is to be expressly understood that the attenuator devices 22 and 23 perform the combined functions of receiver protection and lobe switching thus subjecting the system to a single insertion loss and thereby substantially increasing the overall efficiency thereof. Moreover, the use of attenuator devices embodying the principles of the present invention substantially reduces the size and expense of the system.

Although the attenuator devices have been disclosed and described in connection with a particular type of radio pulse lobe switching system it is to be understood that the present invention may be employed with any type of radio pulse lobe switching system and with other systems or apparatuses wherein the combined functions of high intensity energy attenuation and selective attenuation of lower intensity energy are requirements thereof. Furthermore, it is to be expressly understood that devices constructed in accordance with the principles of the present invention are operable to selectively attenuate all frequencies determined by the Q of the resonant cavity and is not restricted to attenuating frequencies corresponding to one or all of the mean resonant frequencies of the cavity.

There is thus provided by the present invention a novel device for intensity sensitive attenuation of electro-magnetic energy. Devices constructed in accordance with the principles of the present invention have utility in connection with radio pulse systems of the type employing lobe switching wherein such devices fulfill the requirements of receiver protection and of lobe switching. The utilization of a single device to accomplish the foregoing functions increases the overall efficiency of the system. Furthermore, devices embodying the principles of the present invention may be utilized for amplitude modulation of high radio frequency energy, including microwave energy, by applying the desired modulation voltage to the electrode 37 since the degree of attenuation obtained linearly varies in accordance with the operating potential applied.

Although only one embodiment of the present invention has been disclosed and described herein it is to be expressly understood that various changes and substitutions may be made therein without departing from the spirit of the invention as well understood by those skilled in the art. Reference thereto will be had to the appended claims for a definition of the limits of the invention.

The invention described herein may be manufactured and used by or for the Government of the United States of America for governmental purposes without the payment of any royalties thereon or therefor.

What is claimed is:

1. An electromagnetic energy intensity sensitive attenuator comprising a gas-filled resonant cavity energized by energy to be attenuated, a first pair of electrode means included in said cavity for establishing a discharge gap therein operable to destroy resonance of said cavity in the presence of high intensity energy, and a third electrode means operable responsive to an external pulse control voltage to produce a source of ions in said cavity to interact with low intensity energy therein, said third electrode means having selectively connected thereto an external pulse control voltage having a magnitude such that the low intensity energy will be sufficient to establish a discharge gap to destroy resonance of said cavity.

2. A device for controlling radio frequency energy comprising a gas-filled resonant cavity energized by said energy, a pair of electrode means included in said cavity for establishing a discharge gap therein operable to destroy resonance of said cavity in the presence of energy of an intensity greater than a predetermined intensity, a third electrode means establishing a number of ions in said cavity to accelerate operation of said discharge gap means and fourth electrode means operable responsive to an external control pulse voltage to produce a source of ions in said cavity to effect interaction with energy therein of an intensity less than said predetermined intensity, said fourth electrode means having selectively connected thereto an external pulse control voltage having a magnitude such that the addition thereto of an energy of an intensity less than said predetermined intensity will cause a discharge to destroy resonance of said resonant cavity.

3. In combination, means transmitting a series of spaced energy pulses, a plurality of antenna means, receiver means coupled to said antenna means and means effectively decoupling said receiver means from each of said antenna means during intervals of said pulses and selectively during periods between said pulses, the last-named means including a gas-filled resonant cavity coupled to each of said antenna means, each of said cavities including discharge means for producing a gas discharge in the presence of said energy pulses to effectively disconnect said antenna means from said receiver means and means selectively operable to produce a source of ions in said cavities such that when interacting with low intensity energy the gas in the cavity will become ionized causing the cavity to become non-resonant for selectively attenuating low intensity energy passed by said antenna means to said receiver means.

4. An attenuator for electromagnetic energy comprising, a gas-filled cylindrical resonant cavity having input and output wave guide means electrically integral therewith to permit the translation of electromagnetic wave energy diametrically across said cavity, a pair of electrodes axially positioned within said cavity and extending toward each other from opposite end walls of said cavity to form a discharge gap, one of said electrodes being axially movable to permit tuning of the cavity, the other of said electrodes being hollow and having concentrically disposed therein a third electrode, an external voltage pulse source selectively connected to said third electrode to produce an intermittent source of ions in said cavity to interact with low intensity energy waves being propagated therethrough such that a discharge will be formed to destroy resonance of said resonant cavity, and a keep-alive electrode disposed in said cavity operable to establish a continuous source of ions in said cavity to interact with high intensity energy waves being propagated therethrough.

5. In combination, a plurality of antenna means, a pulse transmitter coupled to said antenna means for radiating a series of spaced energy pulses, receiver means for receiving said energy pulses after reflection from remote objects, separate attenuation devices coupling each of said antenna means to said receiver means, each of said last named devices comprising, a gas-filled cylindrical resonant cavity having input and output wave guide means electrically integral therewith to permit the translation of electromagnetic wave energy diametrically across said cavity, a pair of electrodes axially positioned within said cavity and extending toward each other from opposite end walls of said cavity to form a discharge gap, one of said electrodes being axially movable to permit tuning of the cavity, the other of said electrodes being hollow and having concentrically disposed therein a third electrode operable in response to an external voltage pulse applied thereto to produce an intermittent source of ions in said cavity to interact with low intensity energy waves being propagated therethrough, and a keep-alive electrode disposed in said cavity operable to establish a continuous source of ions in said cavity to interact with high intensity energy waves being propagated therethrough.

References Cited in the file of this patent

UNITED STATES PATENTS

| 2,403,303 | Richmond | July 2, 1946 |
| 2,412,751 | Rochester | Dec. 17, 1946 |
| 2,424,984 | Hoffman | Aug. 5, 1947 |
| 2,454,761 | Barrow | Nov. 30, 1948 |
| 2,526,911 | Stone | Oct. 24, 1950 |
| 2,580,389 | Anderson | Jan. 1, 1952 |
| 2,582,205 | Longacre | Jan. 8, 1952 |
| 2,594,732 | Cork | Apr. 29, 1952 |
| 2,618,777 | Ashmead | Nov. 18, 1952 |

FOREIGN PATENTS

| 589,958 | Great Britain | July 4, 1947 |